(12) United States Patent
Alsop et al.

(10) Patent No.: US 6,405,996 B1
(45) Date of Patent: Jun. 18, 2002

(54) CONTROL VALVE FOR EXTREME TEMPERATURES AND PRESSURES

(75) Inventors: Albert W. Alsop, Wilmington; Earl W. Blackwell, Newark, both of DE (US); David A. Douglas, Jr., Glen Mills, PA (US); John M. Iwasyk, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/722,965

(22) Filed: Nov. 27, 2000

(51) Int. Cl.[7] ............................................. F16K 31/126
(52) U.S. Cl. ..................................... 251/331; 251/61.2
(58) Field of Search ........................ 251/331, 61, 61.1, 251/61.2

(56) References Cited

U.S. PATENT DOCUMENTS

| | | | |
|---|---|---|---|
| 3,897,041 A | | 7/1975 | Cowan |
| 4,794,940 A | | 1/1989 | Albert et al. |
| 5,161,775 A | | 11/1992 | Miller |
| 5,851,004 A | * | 12/1998 | Wu et al. .................... 251/331 |
| 6,039,074 A | * | 3/2000 | Raaijmakers et al. .. 251/63.6 X |

* cited by examiner

*Primary Examiner*—Kevin Lee

(57) ABSTRACT

A valve capable of controlling fluid flow at high temperatures and high-pressures. The valve can shut off or regulate flow and combines a small compact shape with the ability to be remotely operated and the ability to process a diverse variety of fluids including polymer melts at extreme temperatures and pressures including two phase fluids. The valve includes a process diaphragm that deflects to seat against a valve seat, a control diaphragm that deflects to contact against a stop surface, and a cylindrical actuating button therebetween. The actuating button has respective end surfaces that contact against the process diaphragm and the control diaphragm. The button end surfaces on the button are spaced apart by a button length. When assembled, the distance between the valve seat and the stop surface is greater than the button length by about the sum of the deflections of the diaphragms.

8 Claims, 4 Drawing Sheets

CONTROL VALVE FOR EXTREME TEMPERATURES AND PRESSURES

FIELD OF INVENTION

The present invention relates generally to control valves and flow regulating valves, and more particularly to valves that will handle molten polymer flow at elevated pressures and temperatures.

BACKGROUND OF THE INVENTION

Controlling molten polymer shut off and flow rates under extreme conditions of temperature and pressure is problematic. These extreme conditions normally include pressures up to and including 2000 psig at temperatures up to and including 300° C. Such pressures and temperatures are often used in experimenting with new polymers in a polymerization reactor under laboratory conditions. Under these conditions pressure control and flow control is often achieved by precise regulation of flows of molten polymer to or from the reactors. Known valves such as the Demi™ valve (G+D15 series manufactured by G.W. Dahl Company, Inc of Bristol, RI. 02809) have a maximum operating pressure of 750 psig at temperatures of 230° C. The large actuator of the Demi™ valve, which must be kept cool, makes compact installations of heated valves very difficult and cumbersome. Thus, a valve that operates at both high temperature and pressure, is compact and easily kept heated is desirable. Such a valve is also believed desirable for more general uses at lower less extreme temperatures and pressures where it is expected to function well and its compact size and simple construction is of value.

The following disclosures may be relevant to various aspects of the present invention and may be briefly summarized as follows:

U.S. Pat. No. 4,794,940 to Albert et al describes a diaphragm valve having two elastomeric diaphragms with a piston therebetween. The body is made of plastic, metal or other materials and comprises a valve base, a spacer ring and a cap. A first diaphragm is clamped between the bottom of the spacer ring and the valve base and a second diaphragm is clamped between the top of the spacer ring and the cap. The spacer ring has a double diameter bore containing a double diameter piston that is contacting both diaphragms. The diaphragm material can be conventional flexible materials such as Teflon, rubber, silicone rubber, or other material impervious to gas or liquid flowing through the valve. One preferred embodiment is a fabric reinforced elastomer 0.06 inches thick. Such a valve cannot handle extreme high temperatures and pressures.

U.S. Pat. No. 3,897,041 to Cowan describes a fluid logic valve that controls "high pressure" air (80 psi). The valve uses two elastomeric diaphragms with a double diameter control element therebetween and functions in much the same manner as the Albert reference '940. It is indicated that flow through the valve may either be quickly stopped by snap action or the valve can be used in an analog fashion to partly restrict flow. The diaphragm is a thin flexible elastomeric member. Such a valve cannot handle extreme high temperatures and pressures.

It is desirable to have a valve at the reactor exit to control polymer flow and the valve must be able to be used at the same temperature and pressure as the polymer in the reactor. The high temperatures and high pressures impose high forces on the valve elements that must reliably operate without binding or seizing. It is desired to place the valve in the same hot bath as the reactor; therefore, the valve must be remotely actuated. It is also desirable to have a valve of compact size to accommodate the small size of the baths normally used in laboratory environments. It is also desired that the actuator not have to be kept cool as this is a source of heat loss from the reactors.

SUMMARY OF THE INVENTION

Briefly stated and in accordance with one aspect of the present invention, there is provided a compact fluid actuated diaphragm valve comprising: a bottom valve body portion having conduits for process fluid in fluid communication with a bottom diaphragm cavity, the bottom diaphragm cavity having a bottom end surface in fluid communication with a first process fluid conduit and a valve seat centered in the bottom diaphragm cavity and protruding from the bottom end surface, the valve seat being in fluid communication with a second process fluid conduit that terminates in an orifice centered in the valve seat, the bottom diaphragm cavity having a bottom shoulder that supports an edge portion of a metallic process diaphragm having a first side spaced from the valve seat and capable of deflection to contact the valve seat, the bottom shoulder having a bottom annular recess contacting the edge portion of the process diaphragm; a process side seal contacting the edge portion of the process diaphragm; an annular sleeve closely fitting in the bottom diaphragm cavity, having a first sleeve end and a second sleeve end, the first sleeve end bearing against the process seal for holding the process seal and process diaphragm in place against the bottom shoulder, the sleeve having a bore centered over the valve seat; a cylindrical diaphragm actuating button, having a major cylindrical button diameter, slidably fitting in the bore of the sleeve and having a first button end surface contacting a second side of the process diaphragm opposite the valve seat, and having a second button end surface, opposed to the first button end surface, the distance between the first button end surfaced and second button end surface defining a button length; a top valve body member having a control fluid conduit for a control fluid in fluid communication with a control diaphragm cavity, the control diaphragm cavity having a top end surface in fluid communication with the control fluid conduit and a stop surface centered in the control diaphragm cavity and protruding from the top end surface, the control diaphragm cavity having a top shoulder that supports an edge portion of a metallic control diaphragm spaced from the stop surface and capable of deflection to contact the stop surface, the control diaphragm cavity of the top valve body member closely fitting around the annular sleeve; a control side seal contacting the edge portion of the control diaphragm; a top annular recess at an interface between the top shoulder and the sleeve, the recess accommodating the edge portion of the control diaphragm and the control seal, the top shoulder and the second sleeve end cooperating so the control seal and edge portion of the control diaphragm are held in the top recess against the top shoulder, the stop surface centered over the bore in the sleeve, the control diaphragm and process diaphragm containing the actuating button therebetween; and fastener means extending from the top valve body member to the bottom valve body member, the fastener means exerting a force forming a process seal at the edge portion of the process diaphragm and a control seal at the edge portion of the control diaphragm, the fastening between the top valve body member and the bottom valve body member creating an assembled valve cavity distance between the valve seat and the stop surface, the valve cavity distance being greater than the button length by about the sum of the distances that each diaphragm is capable of deflecting in the assembly.

BRIEF DESCRIPTION OF THE DRAWINGS

The invention will be more fully understood from the following detailed description, taken in connection with the accompanying drawings, in which.

While the present invention will be described in connection with an embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE DRAWINGS

Reference is now made to the drawings where the showings are for the purpose of illustrating a preferred embodiment of the invention and not for limiting same.

Figure 1:
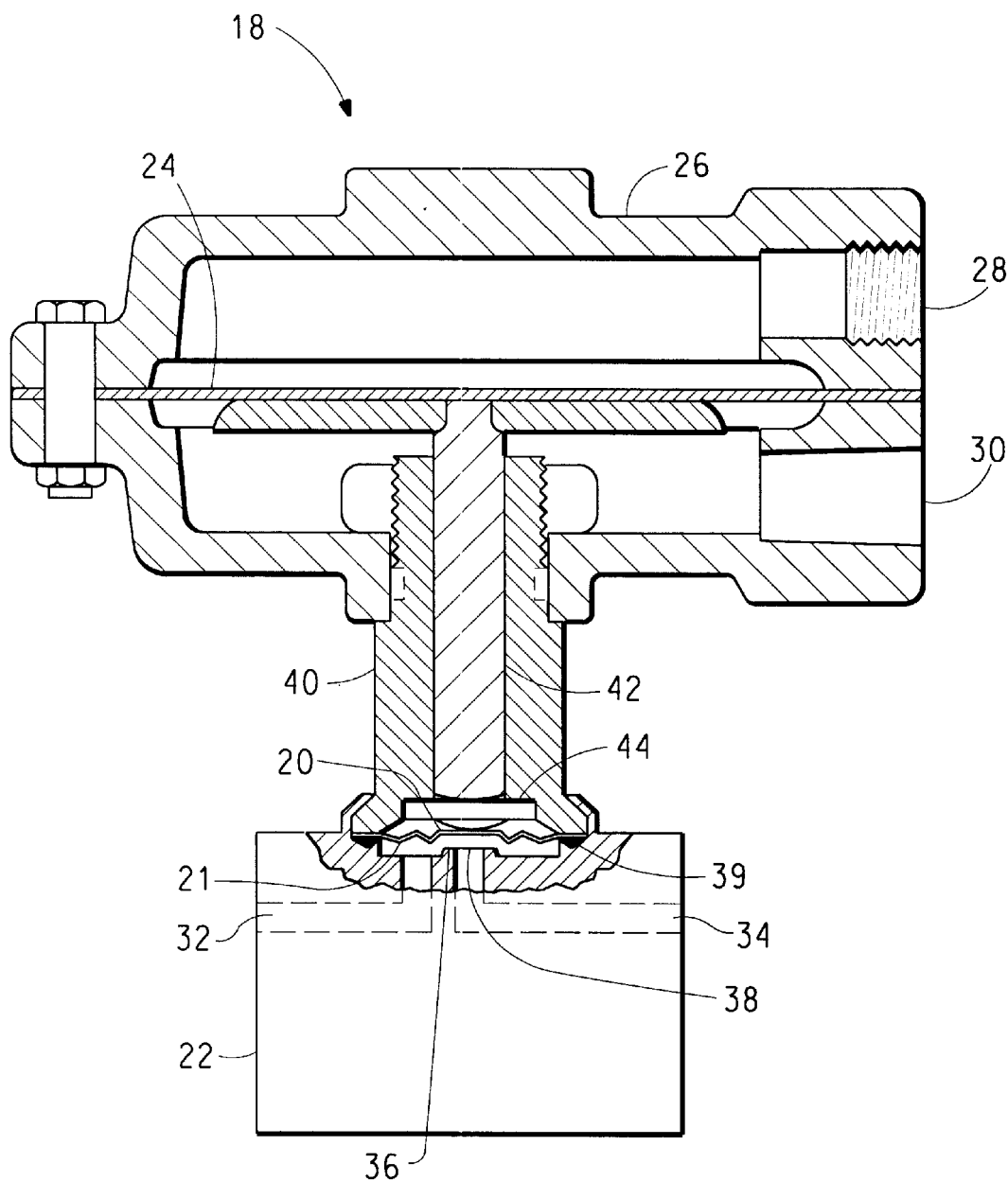
FIG. 1 is a schematic sectional view of a control valve from the prior art.

FIG. 1 is a prior art diagram of a remotely controlled conventional valve manufactured by G.W. Dahl Company, Inc. of Bristol, RI. It is called a Demi™ line model found in catalog D-1A with a single pneumatic actuator. The Demi™ valve 18 has a process side diaphragm 20 to handle process fluid passing through a process section 22 of the valve body, and a control side diaphragm 24 to handle control fluid in a control section 26 of the valve body. Pressure on the control side diaphragm 24 produces a force that is transmitted to a control side diaphragm 24 to control the flow rate and shut off flow of process fluid. Control fluid is introduced and vented through control port 28. A second control port 30 vents the space between the control diaphragm and process diaphragm. Process fluid may enter through a first port 32 and exit through a second port 34 or vice versa. The process diaphragm 20 is positioned over a seat 36 having an orifice 38 through which the process fluid flows. A seal 39, located on the process fluid side of the diaphragm prevents flow of process fluid around the process diaphragm 20. The process diaphragm 20 has conventional convolutions 21 that adapt the diaphragm to deflect without overstress as it is forced toward the seat 36 to regulate the process fluid flow and is forced against the seat 36 to shut off flow. The process fluid pressure acts across the area of the process diaphragm 20. The process diaphragm 20 is a metal diaphragm that can handle high temperature and high-pressure fluids (suggested to be 750 psig at 230° C.) and the control section diaphragm 24 is a reinforced fabric diaphragm with a low temperature and pressure rating (100 psig at 82° C.). The control diaphragm 24 is much larger than the process diaphragm 20 to develop a force balancing the process pressure at the lower pressure rating. The control section diaphragm 24 is located a distance of the standoff 40 away from the process section diaphragm 20 to avoid the high temperatures at the process end. An elongated control shaft 42 passing through the standoff 40 contacts an actuator button 44 thereby transmitting movement of the control diaphragm 24 to the process diaphragm 20. The Demi™ valve provides a bulky valve design where the control side diaphragm must be protected from high temperatures. The large size required of the low pressure control diaphragm also adds to the bulky valve design. Further, the existence of the large diameter metal shaft connecting the actuating diaphragm to the heated valve body results in a rapid loss of heat up the shaft. This sometimes requires cooling to prevent the actuator from being overheated and results in significant loss of heat from the valve body.

Figures 2A, 2B:
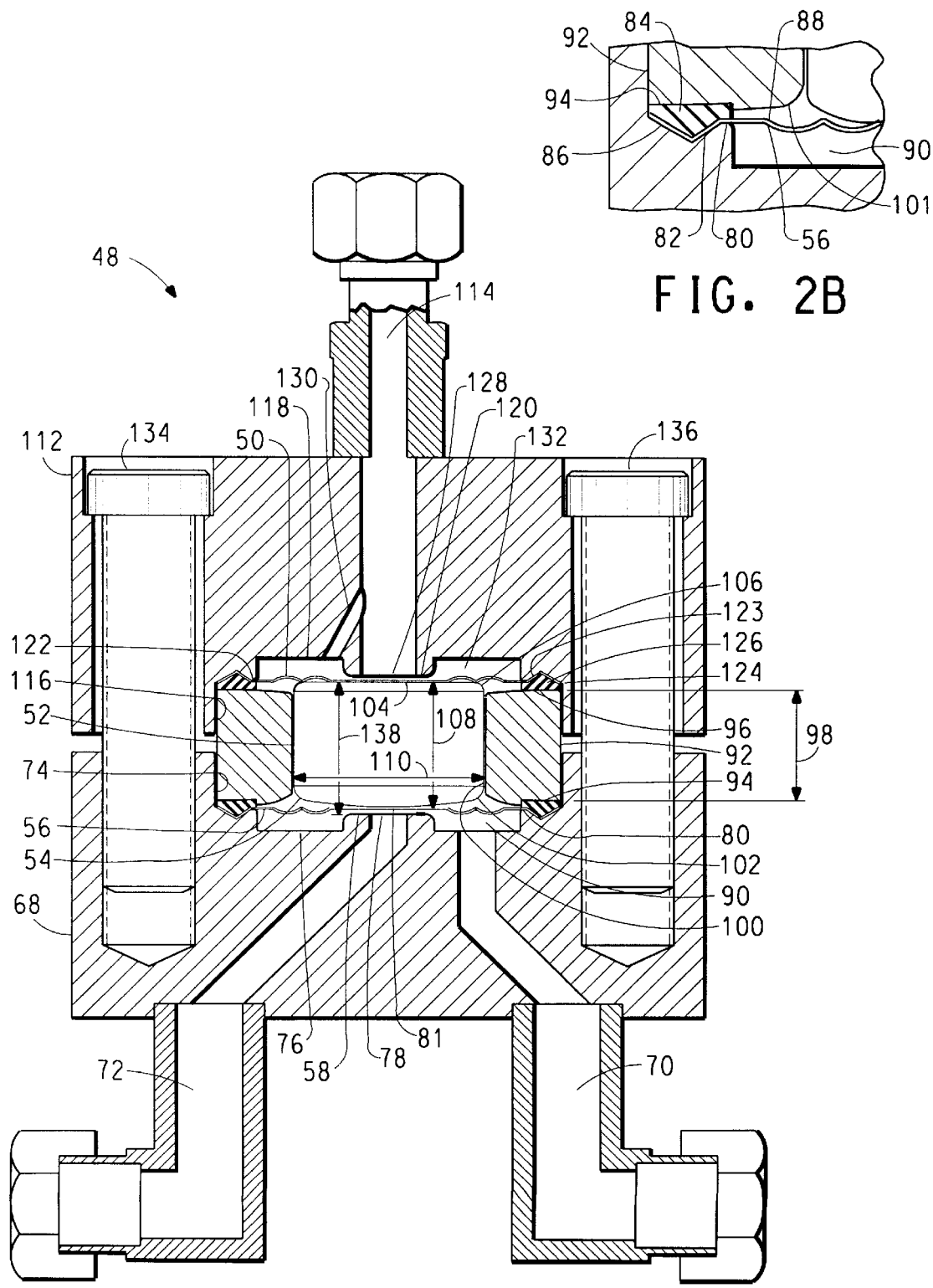
FIG. 2A is a schematic section view of a compact, high temperature, high-pressure control valve of the present invention.
FIG. 2B is an enlarged section of FIG. 2A showing details of the sealing around a diaphragm.

Reference is now made to FIG. 2A which shows a sectional schematic view of a compact, high pressure, high temperature valve 48 of the present invention. FIG. 2A is an improvement over valve 18 of FIG. 1. In FIG. 2A, the valve 48 uses a control fluid (gas or liquid) to create pressure against a thin metal control diaphragm 50. High-pressure nitrogen is known to work as the control fluid. Pressure on diaphragm 50 produces a force that is transmitted to a short cylinder, or button 52 with a rounded convex end 54. The button 52 rests against a lower thin metal process diaphragm 56, which then presses against a valve seat 58 to shut off or regulate flow through the valve seat 58. Flow of process fluid through the valve can be in either direction; however, calibration of the control pressure to the process fluid back pressure is a function of flow direction. Exemplary process fluids known to work in the valve are two-phase water/steam, steam/molten nylon 6, or molten nylon 6 only.

The compact fluid actuated diaphragm valve 48 has a bottom valve body portion 68 having first and second conduits 70 and 72, respectively, for process fluid in fluid communication with a bottom cavity 74. The cavity 74 has a bottom end surface 76 in fluid communication with the first process fluid conduit 70 and has the valve seat 58 centered in the cavity and protruding from the bottom end surface 76. The valve seat 58 is in fluid communication with the second process fluid conduit 72 that terminates in an orifice 78 centered in the valve seat. The cavity 74 has a bottom shoulder 80 that supports the metallic process diaphragm 56 having a first surface 81 spaced away from the valve seat 58. The diaphragm 56 has conventional convolutions 57 (see FIG. 3B) that adapt the diaphragm to deflect without overstress as it moves from a neutral rest position, as shown, to contact the valve seat 58. (The control diaphragm 50 similarly has conventional convolutions 51, as shown in FIG. 3B.)

As shown in the enlarged view of FIG. 2B, the metallic process diaphragm 56 has an edge portion 82 for cooperation with a process side sealing gasket or seal 84. The bottom shoulder 80 has an annular recess 86 for accommodating the edge portion 82 of the diaphragm 56 and the deformable process fluid seal 84. The seal 84 is located on a side 88 of the diaphragm 56 that is opposite the process fluid in process fluid chamber 90 below diaphragm 56, so the process fluid would not ordinarily contact the seal 84. The contact between the seal and the process fluid is normally avoided as such contact may contaminate the process fluid with seal material or the process fluid may damage the seal by chemical interaction. It is believed the actual fluid seal occurs where the edge portion 82 of the diaphragm 56 is forced against the annular recess 86 by the deformable sealing gasket 84. The recess 86 is useful for retaining the edge portion 82 of the diaphragm during deflection of the diaphragm and for retaining the seal 84 to limit migration into the cavity 74 at assembly and during repeated cycles of use.

Referring again to FIG. 2A, the valve 48 has an annular sleeve 92 closely fitting in the diaphragm cavity 74 and having a first annular sleeve end 94 and a second annular sleeve end 96. The first annular sleeve end 94 bears against the process side seal 84 holding the seal 84 and process diaphragm 56 in place against the annular recess 86 in the shoulder 80 (see FIG. 2B). The distance between the first end 94 and second end 96 defines a sleeve length 98. The sleeve 92 has a bore 100 centered over the valve seat 58. Each sleeve end 94, 96 has a sloped entrance, such as entrance 101 at end 94 (FIG. 2B) to accommodate the diaphragm 56 when it deflects toward the sleeve end.

The valve 48 has a top valve body portion 112 having a conduit 114 for control fluid in fluid communication with a top diaphragm cavity 116. The cavity 116 has a top end surface 118 in fluid communication with the control fluid conduit 114 and there is a stop surface 120 centered in the cavity 116 and protruding from the top end surface 118. The cavity 116 has a top shoulder 122 that supports the metallic control diaphragm 50 that has an edge portion 123 for cooperation with a seal. A surface on the diaphragm 50 is spaced from the stop surface 120. The top shoulder 122 has an annular recess 124 for accommodating the edge portion 123 of the diaphragm 50 and a control side sealing gasket or seal 126. The arrangement of the diaphragm 50 and control seal 126 may be the same as the arrangement of process diaphragm 56 and process seal 84 depicted in FIG. 2B, although the considerations around contacting the process seal with a process fluid do not limit the location of the control seal and the top annular recess in the control fluid environment. For instance, at the interface between the top shoulder 122 and the second sleeve end 96, the annular recess 124 may be removed from the top shoulder 122 and placed in the sleeve end 96. The diaphragm would be placed with edge portion 123 in the relocated recess in the sleeve end 96 and the seal 126 would be placed in contact with the edge portion 123 of diaphragm 50. This would place the seal 126 in contact with the control fluid, which is not believed to be a cause of concern when an inert gas is used. The cavity 116 of the top valve body portion 112 is closely fitting around the annular sleeve 92 and interacts with the second end 96 of the sleeve 92 for holding the control seal 126 and control diaphragm 50 in place against the shoulder 122. The stop surface 120 is centered over the bore 100 in the sleeve 92, and conduit 114 terminates in an orifice 128 in the center of the stop surface 120. There is a side conduit 130 in conduit 114 that connects conduit 114 with control fluid chamber 132 above diaphragm 50. This permits control fluid flow through side conduit 130 between chamber 132 and conduit 114 even when diaphragm 50 is pressed against stop surface 120 thereby covering orifice 128. This allows the control fluid to always freely enter the chamber 132 to act on substantially the entire surface area of diaphragm 50. The control diaphragm 50 and process diaphragm 56 contain the actuating button 52 therebetween.

The valve 48 has the cylindrical diaphragm actuating button 52 slidably fitting in the sleeve bore 100. The first (convex) end surface 54 of button 52 contacts the side 88 (see FIG. 2B) of the process diaphragm 56 opposite the valve seat 58 and has a periphery 102 that is radiused to avoid damaging the diaphragm 56. The button 52 has an opposed end surface 104, the periphery 106 of which is radiused. The first convex end surface 54 aids in shutting off flow against the orifice 78. The distance between the convex end 54 and opposed end 104 defines a button length 108 that may exceed the sleeve length 98 by a distance about equal to the compressed thickness of the seals when both seals are located on the sleeve side of the diaphragms. The ratio of the button length 108 to the major cylindrical button diameter 110 is within the range of about 0.5 to about 1.0 to permit free motion without tilting and jamming of the button 52 in the bore 100 and without adding unnecessary length to the button 52 and therefore the valve assembly 48.

The valve 48 has fastening means, such as external clamps (not shown) or a plurality of bolts, such as 134 and 136, extending from the top valve body 112 to the bottom valve body 68. There may be four or more of the bolt fasteners arranged around the sleeve 92 for clamping the sleeve 92 between the bottom valve body 68 and the top valve body 112 and thereby effecting the seal between the process diaphragm 56 and the annular recess 86 in the bottom shoulder 80 and the process fluid seal 84; and between the control diaphragm 50 and the annular recess 124 in the top shoulder 122 and the control fluid seal 126. The assembly forces provided by the fasteners acting on the deformable seals deforms the control diaphragm edge portion 123 and process diaphragm edge portion 82 to cause them to conform to their respective annular recesses 124 and 86. The fastening between the bottom valve body 68 and top valve body 112 establishes an assembled valve cavity distance 138 between the valve seat 58 and the stop surface 120. The valve cavity distance 138 is greater than the button length 108 by a distance equal to the sum of the distances each diaphragm deflects when placed in the assembly plus the thickness of the diaphragms, such greater distance being about 0.020 inches to about 0.050 inches at valve temperatures from 20° C. to 300° C. Since the thickness of the diaphragms is considered negligible (due to its thinness) relative to the deflection distance, the thickness can be ignored in this consideration, so the valve cavity distance 138 should be greater than the button length 108 by a distance equal to the sum of the distances each diaphragm is capable of deflecting.

With continuing reference to FIG. 2A, the valve 48 may typically be constructed of components made all from the same type of metal, such as 316 stainless steel, with the exception of the soft metal crushable seal. Other more corrosion resistant alloys could also be employed. (It is also noted that the material flowing through the valve may place limitations on the metal used for the valve body. For example, a nickel (Ni) based metal is not advisable for a nylon 6 polymer due to a potential detrimental effect on the polymer. However, the valve could be made from a metal containing nickel for another polymer not adversely effected.) By making all the components of the same type of metal, differential thermal expansion is avoided which may upset the close clearances between some of the components or relieve the fastening force on the seals. Since the sum of the deflection distances (for example, about 0.020 inches to about 0.050 inches as mentioned above) may be relatively short, it is important that the button 52 and the other valve components have similar thermal expansion coefficients. If the button length 108 expanded at the operating temperature to more than the valve cavity distance 138 determined by the top valve body 112, bottom valve body 68, sleeve 92 and fasteners, such as bolts 134 and 136, the button may press the control diaphragm 50 against the stop 120 and the process diaphragm 56 against the seat 58 thereby shutting off flow through the valve inadvertently. Sealing of the two diaphragms 50 and 56 by seals 84 and 126 is accomplished through the use of a soft crushable material, such as metal alloy gaskets, for example, an aluminum alloy, copper alloy or brass alloy. In some cases where lower temperatures and pressures permit, the crushable seal gasket could be a polymer, such as a silicone or Vespel® polymer. The seal gasket 84 is protected from the process fluid by the outer edge portion 82 of the corrosion resistant diaphragm 56 as seen in FIG. 2B. This valve has been demonstrated at pressures and temperatures up to and including 2,000 psig at 300° C. The valve is extremely compact and has excellent back pressure control characteristics. The simplicity of the design has proven to be very durable in extreme service.

It is noted that while it is preferable for the valve body and diaphragms to be of the same material, the valve body can be made of a different metal than the diaphragm. (The seal gaskets are still made from a separate soft metal.) For example, where the metal used for the valve body is not feasible for use in the diaphragm (e.g. too brittle), it is possible to use a different metal for the diaphragm. In another example, a more expensive diaphragm may be desired and for economical reasons, the body of the valve is made out of a less expensive metal.

Remote actuation of the valve is accomplished by connecting the upper chamber of the valve to a source of high-pressure inert fluid that is thermally stable at the temperatures where the valve is operated. Since the valve requires very little fluid to pressurize the upper chamber, small diameter tubing of a material able to withstand the pressures and temperatures at which the valve must operate is used. In the examples described herein, ⅛"-316 stainless steel tubing was used to connect the valve to a high pressure gas regulator connected to a cylinder of high pressure nitrogen located remotely from the high temperature valve environment.

Assembly of the Valve for Testing Results of Table 1:

The valve body was assembled as follows. The two valve sections 68 and 112 are assembled with the respective valve cavities 74 and 116 facing upwards. A stainless steel (or other corrosion resistant metal) process diaphragm 56 is placed into the bottom cavity 74 in such a way that the center of the diaphragm is cupped over the center orifice 78 in the valve cavity. A circular aluminum (or other suitable soft metal) seal gasket 84 is placed on top of the diaphragm 56 and is pressed in by hand. The same is done with the top section of the valve for cavity 116. Then the button holder sleeve 92 is placed into the bottom cavity 74 of the valve and the button 52 is placed into the sleeve bore 100 so the flat top 104 of the button 52 is facing upwards and the curved convex (spherical) side 54 is facing downwards to contact, process diaphragm 56. At this point the upper section 112 is carefully placed over the lower section 68 and the sleeve 92 is guided into place in the cavity 116 in the top section 112. After the two body halves 68 and 112 are placed together, fastening means, such as bolts 134 and 136 are inserted through the top section 112 and threaded into the bottom section 68 until they are hand tight. The bolts are then torqued in even increments up to, for example 200 in-lb, to crush the seals 84 and 126, deform the edge portions of the diaphragms such as edge portions 82 and 123, and establish the valve cavity distance 138 to be greater than the button length 108 by a distance equal to the sum of the distances each diaphragm is adapted to deflect (i.e. capable of deflecting). The process lines are attached to the conduits 70 and 72 of the bottom section 68 of the valve and a control fluid line is attached to conduit 114 in the top section 112 of the valve.

In a typical operation of the valve 48, process fluid enters through conduit 70 and exits through conduit 72 under process driving pressure. A control fluid, such as high-pressure nitrogen is applied to conduit 114. The control fluid acts on control diaphragm 50 and forces it to contact button 52 and urges button 52 toward process diaphragm 56. The convex end 54 of button 52 contacts diaphragm 56 and urges it toward seat 58. As the process diaphragm moves toward the seat 58 it begins to restrict flow through orifice 78 and conduit 72. In this way, the control pressure can be used to regulate the flow of process fluid. When the control diaphragm and process diaphragm are about the same area, as shown, if the control pressure exceeds the driving pressure for the process fluid, diaphragm 56 is forced against seat 58 and the flow of process fluid is shut off. The valve can also be operated with process fluid entering conduit 72 and exiting conduit 70. The control pressure levels to regulate and shut off process flow are slightly different in this case from the case first mentioned.

EXAMPLE

The above assembled valve of FIG. 2A was first tested by pumping high-pressure water through the valve at a rate of 5.23 lb/hr at ambient temperature. It was then tested for high temperature operation, by immersing the valve in a high temperature sandbath at 280° C. The process fluid passing through the valve for the high temperature test was either liquid water or a flashing two-phase water and steam mixture. The valve control pressure was systematically raised and lowered multiple times and the back pressure generated by the valve on the flowing process liquid recorded. It was noticed that the first few cycles of the valve when it was just assembled with new diaphragms and seals produced slightly different results from later tests after the valve had been "broken in". The data in Table 1 reflects typical values for a valve that has been "broken in". The control pressure was varied up and down as indicated in the first column for two different up-down cycles with the valve and process fluid at ambient temperature; the process pressure varied as shown in the columns 2–5. In columns 2 and 4, the control pressure was going up and in columns 3 and 5, the control pressure was going down. The control pressure was varied again on two different up-down cycles as indicated in the sixth column with the valve and process fluid at 280° C.; the process pressure varied as shown in columns 7–10 in a manner the same as in columns 2–5. The control pressure was more than the process pressure for values of control pressure above about 1600 psig. At the control pressure of 2400 psig, the process flow was shut off at about 1800. The results, shown in Table 1, indicate the valve can predictably control process pressure over a wide range of conditions. (The abbreviations of "cont. press." and "proc. press." for "control pressure" and "process pressure", respectively.)

TABLE 1

H.T.H.P. VALVE

| TEMP.> CONT. PRESS. 1 PSIG. | AMBIENT PROC. PRESS. 2 PSIG. | AMBIENT PROC. PRESS. 3 PSIG. | AMBIENT PROC. PRESS. 4 PSIG. | AMBIENT PROC. PRESS. 5 PSIG. | TEMP.> CONT. PRESS 6 PSIG. | 280° C. PROC. PRESS. 7 PSIG. | 280° C. PROC. PRESS 8 PSIG. | 280° C. PROC. PRESS 9 PSIG. | 280° C. PROC. PRESS 10 PSIG. |
|---|---|---|---|---|---|---|---|---|---|
| 0 | 55 | 55 | 55 | 55 | 0 | 100 | 100 | 100 | 110 |
| 200 | 300 | 275 | 300 | 290 | 200 | 250 | 270 | 245 | 250 |
| 400 | 525 | 525 | 525 | 525 | 400 | 490 | 480 | 485 | 475 |

TABLE 1-continued

H.T.H.P. VALVE

| TEMP.> CONT. PRESS. 1 PSIG. | AMBIENT PROC. PRESS. 2 PSIG. | AMBIENT PROC. PRESS. 3 PSIG. | AMBIENT PROC. PRESS. 4 PSIG. | AMBIENT PROC. PRESS. 5 PSIG. | TEMP.> CONT. PRESS 6 PSIG. | 280° C. PROC. PRESS. 7 PSIG. | 280° C. PROC. PRESS 8 PSIG. | 280° C. PROC. PRESS 9 PSIG. | 280° C. PROC. PRESS 10 PSIG. |
|---|---|---|---|---|---|---|---|---|---|
| 600 | 750 | 750 | 750 | 735 | 600 | 700 | 700 | 700 | 700 |
| 800 | 950 | 975 | 975 | 950 | 800 | 900 | 900 | 895 | 900 |
| 1000 | 1175 | 1175 | 1190 | 1175 | 1000 | 1100 | 1125 | 1100 | 1125 |
| 1200 | 1350 | 1375 | 1375 | 1400 | 1200 | 1300 | 1325 | 1290 | 1325 |
| 1400 | 1575 | 1550 | 1525 | 1555 | 1400 | 1475 | 1510 | 1450 | 1500 |
| 1600 | 1600 | 1625 | 1610 | 1650 | 1600 | 1600 | 1625 | 1600 | 1625 |
| 1800 | 1650 | 1675 | 1675 | 1700 | 1800 | 1650 | 1700 | 1660 | 1700 |
| 2000 | 1700 | 1715 | 1710 | 1775 | 2000 | 1725 | 1750 | 1725 | 1750 |
| 2200 | 1750 | 1750 | 1750 | 1775 | 2200 | 1775 | 1800 | 1775 | 1800 |
| 2400 | 1800 | 1800 | 1800 | 1800 | 2400 | 1825 | 1825 | 1815 | 1815 |

Figure 3A:
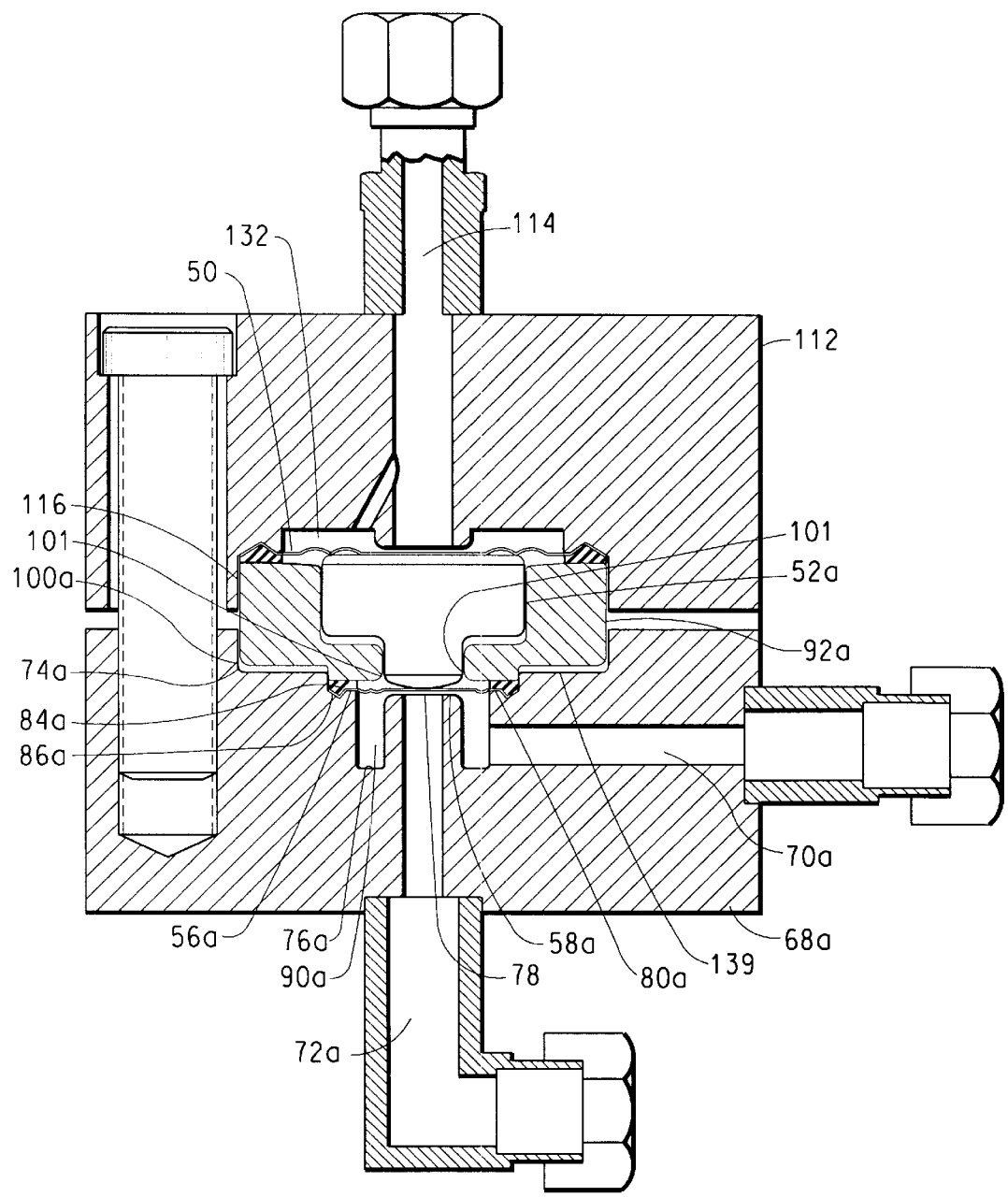
FIG. 3A is an alternate embodiment of the valve of FIG. 2A showing a process diaphragm smaller than the control diaphragm.
Figure 3B:
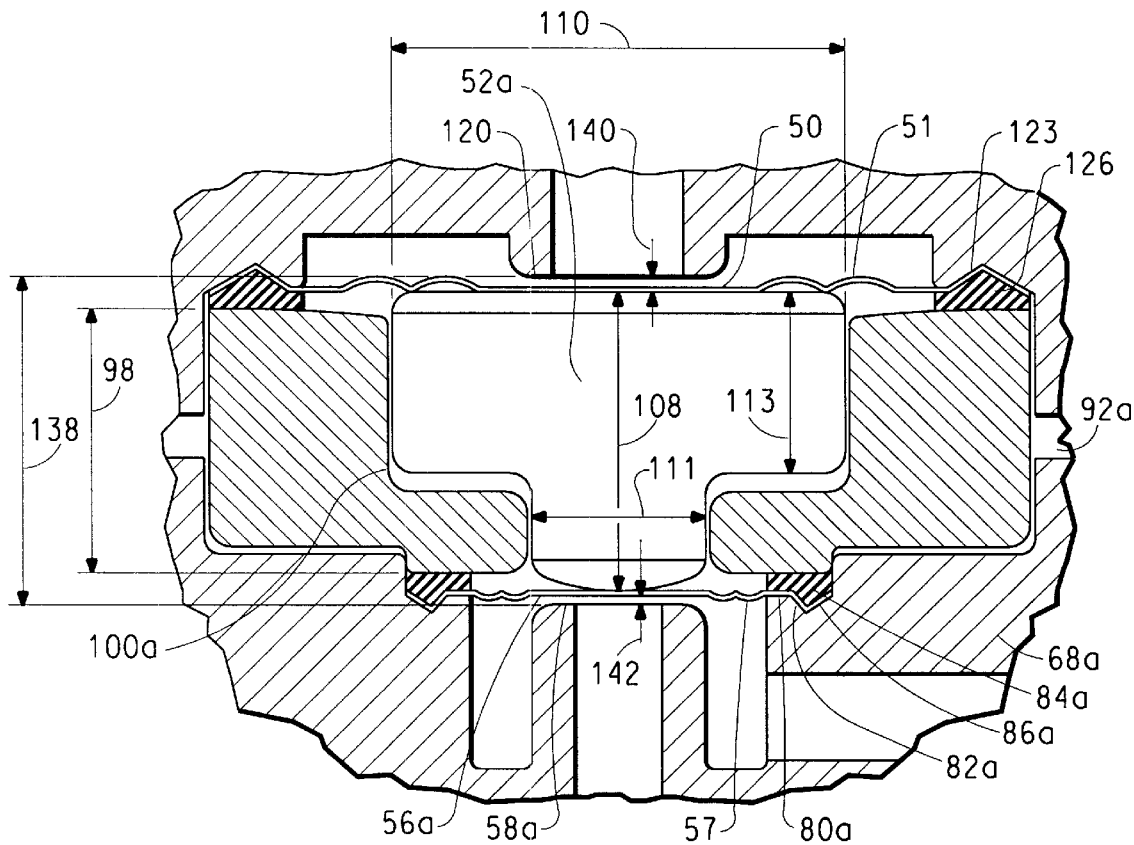
FIG. 3B is an enlarged section of FIG. 3A showing details of the sealing around the diaphragms.

FIG. 3A shows another embodiment of the present invention of the valve in which the active area of the process diaphragm 56a has been reduced in size so the control pressure to shut off the process flow can be much less than the process pressure. The top valve body portion 112, cavity 116, control fluid chamber 132, and the control diaphragm 50 are essentially the same as that in the valve of FIG. 2A. Conduit 114 supplies control fluid to the top valve body portion 112. The bottom body portion 68a has had the bottom cavity 74a modified to reduce the diameter of bottom surface 76a and reduce the diameter of annular recess 86a to reduce the area of process diaphragm 56a exposed to the process pressure in process fluid chamber 90a. In addition, a step 139 is added to the bottom cavity 74a to provide an alignment diameter for the process diaphragm 56a. Conduits 70a and 72a supply process fluid to the bottom valve body portion 68a. Referring also to enlarged view 3B, annular sleeve 92a and button 52a have been modified to provide a stepped diameter change from the diameter of the control diaphragm to the reduced diameter of the process diaphragm. Cylindrical button 52a has a major diameter 110 that fits in the bore 100a of sleeve 92a, and a minor diameter 111 that fits in a bore 100a of sleeve 92a (See FIG. 3B). The minor diameter 111 is arranged adjacent the process diaphragm 56a and the major diameter 110 is arranged adjacent the control diaphragm 50. Since the minor diameter 111 contacting the process diaphragm 56a is small in size relative to the orifice 78 in seat 58a and has a generous radius on the corners, it does not require a convex shape to shut off flow as did the larger end of the button contacting the process diaphragm in the embodiment of FIG. 2A. However, a convex shape can be used on the minor diameter end of the button 52a. The major diameter 110 has a length 113 that is a major proportion of the overall button length 108 (see FIG. 3B). The ratio of the button length 108 to the major cylindrical button diameter 110 is about 0.5 to about 1.0. The process diaphragm 56a has an edge portion 82a seen in the enlarged view of FIG. 3B cooperating with a process fluid seal 84a that fits in the annular recess 86a of bottom shoulder 80a. The diameter of the edge portion 82a, annular recess 86a, and seal 84a in the bottom valve body portion 68 is less than the diameter of the edge portion, annular recess, and seal in the top valve body portion 112. This allows a low-pressure control fluid to regulate a high-pressure process fluid. When the fastening means exerts a force forming a process seal at the edge portion 82a of the process diaphragm 56a and a control seal at the edge portion 123 of the control diaphragm 50, the fastening between the top valve body member 112 and the bottom valve body member 68 establishes an assembled valve cavity distance 138. This distance 138 between the valve seat 58a and the stop surface 120 is greater than the button length 108a by the sum of the distance each diaphragm is adapted to deflect in the assembly, such as the deflection distance 140 between the stop surface 120 and the control diaphragm 50 and the deflection distance 142 between the valve seat 58a and the process diaphragm 56a.

While an embodiment of the valve has been discussed relative to use at high temperature and high pressure, it is believed that the valve of the present invention is applicable for more general uses at lower less extreme temperatures and pressures where it is expected to function well and its compact size and simple construction is of value. It is further noted that at such temperatures the all metal construction of the high temperature, high-pressure valve is no longer required. At lower temperatures such as room temperature, a variety of materials may be used for the valve construction and the valve body need not be made entirely from the same material.

In recapitulation, the present invention provides a valve that can shut off or regulate flow and that combines a small compact shape with the ability to be remotely operated. The valve of the present invention is able to process a diverse variety of fluids including polymer melts at extreme temperatures and pressures and two-phase fluids.

It is therefore apparent that there has been provided in accordance with the present invention a compact fluid actuated diaphragm valve. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:

1. A compact fluid actuated diaphragm valve comprising:
    a bottom valve body portion having conduits for process fluid in fluid communication with a bottom diaphragm cavity, the bottom diaphragm cavity having a bottom end surface in fluid communication with a first process fluid conduit and a valve seat centered in the bottom diaphragm cavity and protruding from the bottom end surface, the valve seat being in fluid communication with a second process fluid conduit that terminates in an orifice centered in the valve seat, the bottom diaphragm cavity having a bottom shoulder that supports an edge portion of a metallic process diaphragm having a first side spaced from the valve seat and capable of deflection to contact the valve seat, the bottom shoulder having a bottom annular recess contacting the edge portion of the process diaphragm;

a process side seal contacting the edge portion of the process diaphragm;

an annular sleeve closely fitting in the bottom diaphragm cavity, having a first sleeve end and a second sleeve end, the first sleeve end bearing against the process seal for holding the process seal and process diaphragm in place against the bottom shoulder, the sleeve having a bore centered over the valve seat;

a cylindrical diaphragm actuating button, having a major cylindrical button diameter, slidably fitting in the bore of the sleeve and having a first button end surface contacting a second side of the process diaphragm opposite the valve seat, and having a second button end surface, opposed to the first button end surface, the distance between the first button end surface and second button end surface defining a button length;

a top valve body member having a control fluid conduit for a control fluid in fluid communication with a control diaphragm cavity, the control diaphragm cavity having a top end surface in fluid communication with the control fluid conduit and a stop surface centered in the control diaphragm cavity and protruding from the top end surface, the control diaphragm cavity having a top shoulder that supports an edge portion of a metallic control diaphragm spaced from the stop surface and capable of deflection to contact the stop surface, the control diaphragm cavity of the top valve body member closely fitting around the annular sleeve;

a control side seal contacting the edge portion of the control diaphragm;

a top annular recess at an interface between the top shoulder and the sleeve, the recess accommodating the edge portion of the control diaphragm and the control seal, the top shoulder and the second sleeve end cooperating so the control seal and edge portion of the control diaphragm are held in the top recess against the top shoulder, the stop surface centered over the bore in the sleeve, the control diaphragm and process diaphragm containing the actuating button therebetween; and fastener means extending from the top valve body member to the bottom valve body member, the fastener means exerting a force forming a process seal at the edge portion of the process diaphragm and a control seal at the edge portion of the control diaphragm, the fastening between the top valve body member and the bottom valve body member creating an assembled valve cavity distance between the valve seat and the stop surface, the valve cavity distance being greater than the button length by about the sum of the distances each diaphragm is capable of deflecting.

2. The valve of claim 1, wherein a ratio of the button length to the major cylindrical button diameter is 0.5 to 1.0.

3. The valve of claim 1, wherein the cylindrical button comprises the major cylindrical button diameter and a minor diameter, the minor diameter being adjacent the process diaphragm and the major cylindrical button diameter adjacent the control diaphragm.

4. The valve of claim 3, wherein a ratio of the button length to the major cylindrical button diameter is 0.5 to 1.0 and the diameter of the bottom shoulder annular recess and process seal is less than the diameter of the top annular recess and control seal.

5. The valve of claim 1, wherein the process seal and control seal are both made of a soft metal.

6. The valve of claim 5, wherein the valve, not including the process seal and the control seal, is made from one metallic material.

7. The valve of claim 5, wherein the soft metal is selected from the group of aluminum, brass, and copper.

8. The valve of claim 6, wherein the metallic material is stainless steel.

* * * * *